US009188976B1

(12) United States Patent
Kim et al.

(10) Patent No.: US 9,188,976 B1
(45) Date of Patent: Nov. 17, 2015

(54) CONTENT ENABLING COVER FOR ELECTRONIC BOOK READER DEVICES (75) Inventors: John T. Kim, La Canada, CA (US); Joseph J. Hebenstreit, San Francisco, CA (US)

(73) Assignee: Amazon Technologies, Inc., Reno, NV (US)

(*) Notice: Subject to any disclaimer, the term of this patent is extended or adjusted under 35 U.S.C. 154(b) by 895 days.

(21) Appl. No.: 12/553,081

(22) Filed: Sep. 2, 2009

(51) Int. Cl.
*G05B 23/02* (2006.01)
*G06F 21/79* (2013.01)

(52) U.S. Cl.
CPC .............. *G05B 23/02* (2013.01); *G06F 21/79* (2013.01)

(58) Field of Classification Search
CPC ................ Y10S 345/901; G06F 2221/2153; G06F 15/0283; G06F 21/62; G06F 21/79; G06F 21/10; G06F 2221/2149; G06F 3/0481; G06F 2221/2141; H04B 5/0062; G06Q 20/00; G06Q 20/32; G06K 19/0716; G06K 19/07758; G06K 19/0723; G06K 19/07796; G06K 19/07749; H04M 1/72575; H04M 1/7253; H04M 1/66
USPC .......................................................... 340/3.1
See application file for complete search history.

(56) References Cited

U.S. PATENT DOCUMENTS

| | | | | |
|---|---|---|---|---|
| 5,956,048 A * | 9/1999 | Gaston | ............................ | 345/530 |
| 6,493,734 B1 * | 12/2002 | Sachs et al. | .................... | 715/212 |
| 6,851,822 B2 * | 2/2005 | Herrera | ............................ | 362/99 |
| 6,876,295 B1 * | 4/2005 | Lewis | .......................... | 340/10.34 |
| 6,931,538 B1 | 8/2005 | Sawaguchi | | |
| 7,006,116 B1 * | 2/2006 | Meyers et al. | ................ | 345/156 |
| 7,065,557 B2 * | 6/2006 | Sowden et al. | ................ | 709/217 |
| 7,298,851 B1 * | 11/2007 | Hendricks et al. | ............. | 380/282 |
| 7,570,164 B2 * | 8/2009 | Chakraborty et al. | ...... | 340/572.1 |
| 7,748,634 B1 * | 7/2010 | Zehr et al. | ...................... | 235/492 |
| 7,797,549 B2 | 9/2010 | Main et al. | | |
| 7,916,175 B2 * | 3/2011 | Yamakita | ................. | 348/207.99 |
| 7,965,873 B2 * | 6/2011 | Goto | ............................. | 382/115 |
| 8,047,670 B2 * | 11/2011 | Patrick et al. | .................... | 362/98 |
| 8,169,447 B2 * | 5/2012 | Bhogal et al. | .................. | 345/589 |
| 8,186,843 B2 * | 5/2012 | Mish et al. | ...................... | 362/98 |
| 2002/0087555 A1 * | 7/2002 | Murata | ......................... | 707/10 |
| 2002/0152215 A1 * | 10/2002 | Clark et al. | ..................... | 707/10 |
| 2002/0158601 A1 * | 10/2002 | Kuo et al. | ...................... | 320/107 |
| 2002/0177330 A1 * | 11/2002 | Haffenden et al. | ................ | 439/6 |
| 2003/0069812 A1 * | 4/2003 | Yuen et al. | ....................... | 705/27 |
| 2003/0073326 A1 * | 4/2003 | MacLaren et al. | .............. | 439/43 |
| 2003/0093312 A1 * | 5/2003 | Ukita et al. | ...................... | 705/10 |
| 2003/0100346 A1 * | 5/2003 | Kostiainen | ..................... | 455/567 |
| 2003/0135748 A1 * | 7/2003 | Yamada et al. | ................ | 713/193 |
| 2003/0236102 A1 * | 12/2003 | Kawai et al. | ............... | 455/550.1 |
| 2004/0059923 A1 | 3/2004 | ShamRao | | |

(Continued)

OTHER PUBLICATIONS

Wikipedia—Universal Serial Bus, Dec. 5, 2008.*

(Continued)

*Primary Examiner* — Quang D Pham
(74) *Attorney, Agent, or Firm* — Lee & Hayes, PLLC (57) ABSTRACT

A dedicated electronic book reader device and accompanying accessory are described. When the accessory is used with the electronic book reader device, the accessory unlocks content that would otherwise be unavailable to the device. The accessory may be configured to provide a password that unlocks content stored on the electronic book reader device, stored on the accessory, or stored remotely. In one implementation, the accessory is a cover which also physically protects the electronic book reader.

30 Claims, 8 Drawing Sheets

(56) References Cited

U.S. PATENT DOCUMENTS

| | | | |
|---|---|---|---|
| 2004/0180657 A1 | 9/2004 | Yaqub et al. | |
| 2004/0194133 A1* | 9/2004 | Ikeda et al. | 725/37 |
| 2004/0218451 A1* | 11/2004 | Said et al. | 365/222 |
| 2005/0026643 A1* | 2/2005 | White et al. | 455/550.1 |
| 2005/0138392 A1 | 6/2005 | Johnson et al. | |
| 2005/0198208 A1* | 9/2005 | Nystrom | 709/219 |
| 2005/0227729 A1* | 10/2005 | Nakayama | 455/558 |
| 2005/0264540 A1* | 12/2005 | Niwa | 345/173 |
| 2006/0148454 A1* | 7/2006 | Welch | 455/414.1 |
| 2006/0149727 A1* | 7/2006 | Viitaharju | 707/5 |
| 2006/0194181 A1* | 8/2006 | Rosenberg | 434/317 |
| 2006/0279412 A1* | 12/2006 | Holland et al. | 340/10.51 |
| 2007/0088747 A1* | 4/2007 | Cheng et al. | 707/104.1 |
| 2007/0257799 A1* | 11/2007 | Bauchot et al. | 340/572.1 |
| 2008/0048837 A1* | 2/2008 | Montgomery et al. | 340/10.51 |
| 2008/0120312 A1* | 5/2008 | Reed et al. | 707/100 |
| 2008/0164304 A1* | 7/2008 | Narasimhan et al. | 235/375 |
| 2008/0168073 A1* | 7/2008 | Siegel et al. | 707/100 |
| 2008/0243991 A1* | 10/2008 | Ryan et al. | 709/203 |
| 2008/0268415 A1* | 10/2008 | Kwong | 434/317 |
| 2008/0298083 A1* | 12/2008 | Watson et al. | 362/603 |
| 2009/0095804 A1* | 4/2009 | Agevik et al. | 235/375 |
| 2009/0134973 A1* | 5/2009 | Sandler et al. | 340/10.1 |
| 2009/0150553 A1* | 6/2009 | Collart et al. | 709/229 |
| 2009/0204663 A1* | 8/2009 | Patwari | 709/203 |
| 2009/0219271 A1* | 9/2009 | Bandel et al. | 345/211 |
| 2009/0254762 A1* | 10/2009 | Priel et al. | 713/193 |
| 2009/0292643 A1* | 11/2009 | Wu | 705/80 |
| 2010/0010914 A1* | 1/2010 | Park | 705/26 |
| 2010/0036934 A1* | 2/2010 | Bruster | 709/219 |
| 2010/0052863 A1* | 3/2010 | Renfro et al. | 340/10.4 |
| 2010/0141689 A1* | 6/2010 | Johnson | 345/690 |
| 2010/0149739 A1* | 6/2010 | Mish et al. | 361/679.02 |
| 2010/0181450 A1* | 7/2010 | Hulick et al. | 248/229.2 |
| 2010/0251358 A1* | 9/2010 | Kobayashi et al. | 726/18 |
| 2010/0283690 A1* | 11/2010 | Artigue et al. | 343/702 |
| 2011/0187505 A1 | 8/2011 | Faith et al. | |
| 2011/0307823 A1* | 12/2011 | Wu | 715/776 |
| 2012/0031786 A1* | 2/2012 | Mish et al. | 206/320 |
| 2012/0139693 A1* | 6/2012 | Zucker et al. | 340/5.2 |
| 2012/0194322 A1* | 8/2012 | Batra | 340/10.33 |
| 2013/0208414 A1* | 8/2013 | Moser | 361/679.32 |
| 2014/0323053 A1* | 10/2014 | Yamaoka et al. | 455/41.2 |
| 2015/0070329 A1* | 3/2015 | Bouchard | 345/179 |

OTHER PUBLICATIONS

Office action for U.S. Appl. No. 12/720,275, mailed on Jul. 8, 2013, Leblang, "Securing Content Using a Wireless Authentication Factor", 18 pages.

Final Office Action for U.S. Appl. No. 12/720,275, mailed on Jan. 29, 2014, Jonathan A. Leblang, "Securing Content Using a Wireless Authentication Factor", 12 pages.

* cited by examiner

CONTENT ENABLING COVER FOR ELECTRONIC BOOK READER DEVICES

BACKGROUND

A large and growing population of users is enjoying entertainment through the consumption of digital media items, such as music, movies, images, electronic books, and so on. The users employ various electronic devices to consume such media items. Among these electronic devices are electronic book ("eBook") readers, cellular telephones, personal digital assistant (PDA), portable media players, tablet computers, netbooks, and the like.

These electronic devices are often accompanied by one or more accessories. Existing accessories for electronic devices generally contribute to aesthetics and provide protection (e.g., cover or case) or alternatively enhance the functionality of the electronic device (e.g., memory stick or wireless card). Carrying numerous accessories may detract from the portability of a mobile electronic device and the purpose of some accessories may be obscure to users who are not familiar with the functionality included in modern electronic devices.

As the popularity of such devices continues to grow, there is an ongoing need for ways to enhance or improve functionality of these devices through the use of accessories without detracting from the user experience.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

This disclosure is directed towards an assembly of a dedicated handheld electronic book ("eBook") reader device and an accessory for that eBook reader device. The eBook reader device is designed to allow users to read or otherwise consume electronic content (e.g., text, graphics, multimedia, and the like), such as that found in eBooks, magazines, RSS feeds, newspapers, and the like.

The accessory is configured to be used with the eBook reader device, and particularly, to enable access to content for the eBook reader device when in use. In the implementations described herein, the accessory is embodied as a cover for the eBook reader device. While the cover protects the device and modifies aesthetics, it is also configured to supply a password or other key to unlock additional content that is otherwise unavailable to the eBook reader device.

While the accessory is described in the context of a cover, it is noted that potentially other types of accessories may be configured to enable access to content for the eBook reader device. Such accessories may include, but are not limited to, a reading light, a stand or support structure, a carrying case, or any other mechanism that is not typically designed or intended to alter or extend functionality of the eBook reader device itself. Accordingly, the discussion of a cover in this disclosure may equally apply to other such types of accessories that may be used in conjunction with the eBook reader device.

Illustrative Architecture

Figure 1:
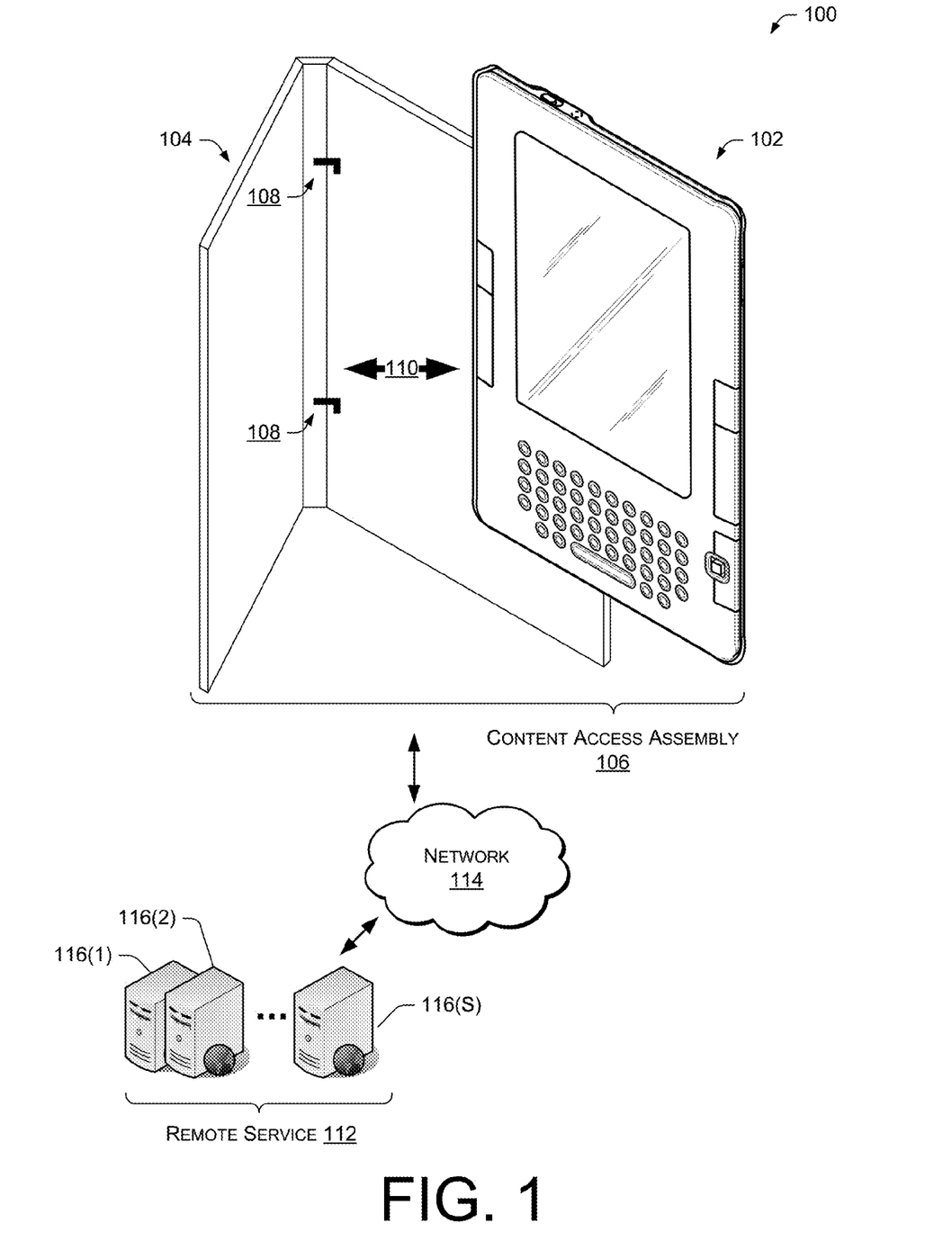
FIG. 1 illustrates one exemplary implementation of an architecture that includes a dedicated handheld electronic book ("eBook") reader device, a content-enabling cover for the handheld eBook reader device, and a remote service.

FIG. 1 illustrates an example architecture 100 in which an accessory for an eBook reader device is used to enable access to content for the eBook reader device that would otherwise not be available. The architecture 100 includes a handheld dedicated eBook reader device 102 and an accessory in the form of a cover 104 for the eBook reader device. When attached, the eBook reader device 102 and the cover 104 form an assembly 106 that may be used to access content that is otherwise unavailable to the eBook reader device 102 absent the cover 104.

The cover 104 may be physically affixed to the eBook reader device 102 by one or more connectors 108. In the illustrated implementation of FIG. 1, there are two connectors 108 positioned and spaced apart along the spine of the cover 104. The connectors 108 are formed as L-shaped hooks that latch or otherwise mate with receiving apertures (not shown) in the side of the eBook reader device 102. It is noted, however, that other shapes and connection mechanisms may be used, such as magnetism, adhesion, hook-and-loop fasteners, elastic straps, and so on. In some implementations, the cover 104 may be formed as a sleeve into which the eBook reader device 102 is placed. In such implementations, the cover 104 may lack discrete connectors 108 because the cover 104 itself functions as a connector by surrounding the eBook reader device 102.

The connectors 108 may further facilitate an electrical connection as well as a physical connection. For example, a connector 108 may carry electrical current for power or signaling. The connector 108 may be a single conductor, providing a single current path, or may contain a plurality of conductors insulated from one another. For example, a top conductive layer may be separated from a bottom conductive layer by an insulator, forming two conductive pathways. Alternately, a non-conductive connector 108, or a connector 108 coated with an insulator, may have a plurality of conductive traces disposed along a surface of the connector 108.

A communicative connection 110 is established between the cover 104 and the eBook reader device 102 when the cover 104 is placed on and physically connected with the eBook reader device 102. The communicative connection 110 may be used to provide a password or other information from the cover 104 to the eBook reader device 102 to enable access to content that would otherwise be unavailable to the device 102, as will be described in more detail below. The connection 110 may be established in any number of ways. In one approach, the connectors 108 may be uniquely shaped (e.g., like a key) so that information is provided to the eBook reader device 102 based upon the physical configuration of the connectors 108. In another approach, the communicative connection 110 may be implemented through an electrical connection created by the connectors 108. In yet another approach, the communicative connection 110 may be established wirelessly between the cover 104 and the device 102.

The architecture 100 further includes a remote service 112 that is accessible by the assembly 106 over a network 114. The remote service 112 is hosted by one or more servers 116(1), 116(2), ..., 116(S), which collectively have processing and storage capabilities to receive requests from the assembly 106 and to provide content or other services to the assembly. In some implementations, the servers 116(1)-(S) store the digital content items and download those items upon request from the eBook reader device and cover assembly 106. The servers 116(1)-(S) may be embodied in any number of ways, including as a single server, a cluster of servers, a server farm or data center, and so forth, although other server architectures (e.g., mainframe) may also be used. The network 114 is representative of any one or combination of multiple different types of networks, such as the Internet, cable networks, cellular networks, wireless networks, and wired networks. The eBook reader device 102 may be configured with a wireless network interface to facilitate wireless connection with the network 114.

As noted above, the cover 104, when attached to the eBook reader device 102, enables the eBook reader device to access certain content. The cover may be equipped with a password or other key that is used to unlock this content. The content may be stored on the eBook reader 102 and made available upon receipt of the password or other key from the cover 104. Alternatively, the content may be stored at the remote service 112 and downloaded to the eBook reader device 102 over the network 114 when unlocked by the password or other key from the cover 104. These aspects are described below in more detail.

Figure 2:
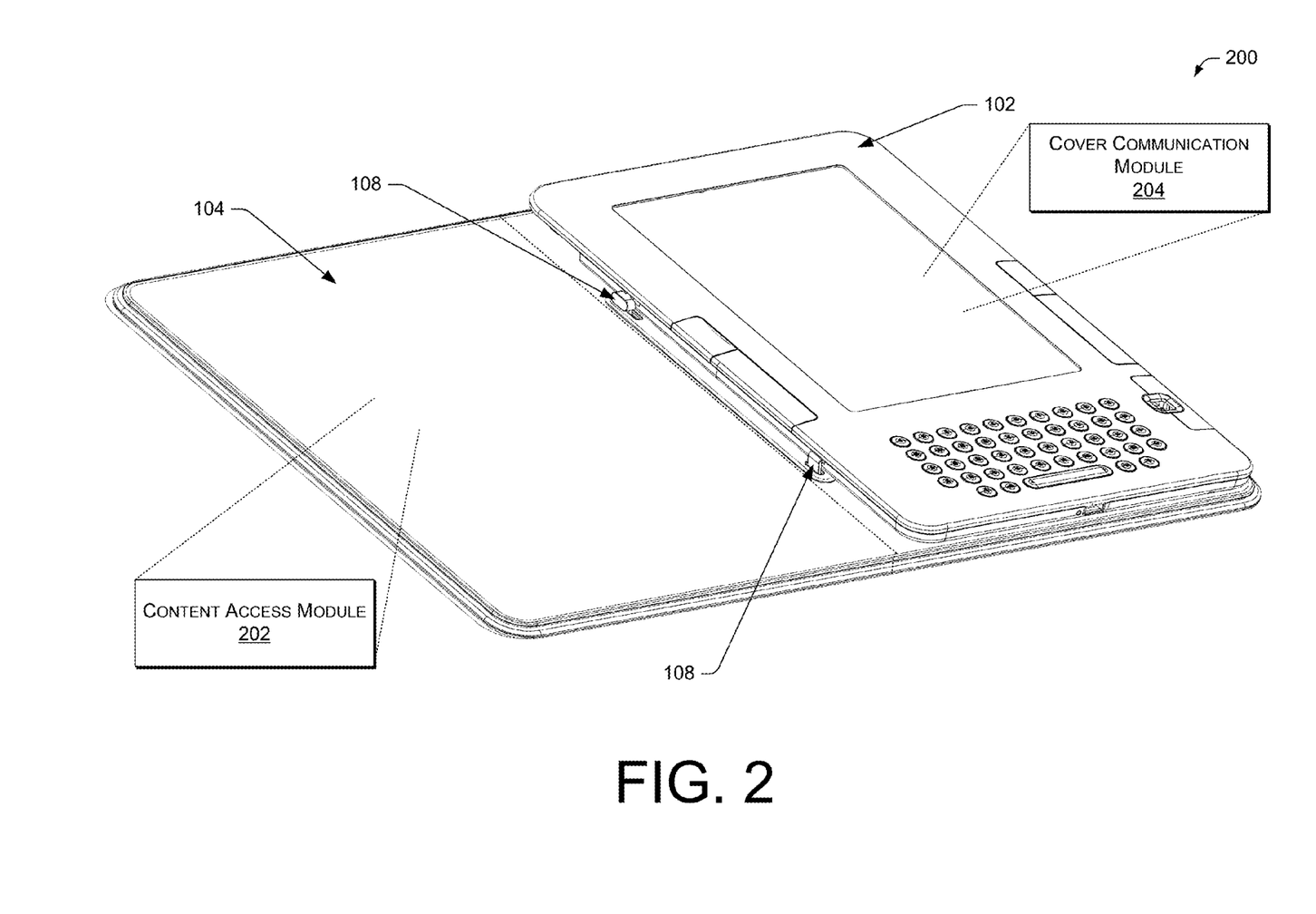
FIG. 2 shows a perspective view of the handheld eBook reader device and the cover of FIG. 1, with additional functional blocks showing components that may be implemented in the eBook reader device and the cover.

FIG. 2 illustrates a perspective view 200 of the eBook reader device 102 attached to the cover 104 by the connectors 108. The cover 104 may have various internal components, such as a content access module 202. The content access module 202 provides a password or other data (e.g., key, a unique identifier, a list of access privileges, etc.) to the eBook reader device 102. The content access module 202 may be implemented as a passive component, such as a radio frequency identification (RFID) tag, which does not require its own power, but becomes active upon inquisition from an external RFID reader. Alternatively, the content access module 202 may be an active electronic component that has a battery or power source to enable communication of the password or other data.

The eBook reader device 102 may be equipped with a cover communication module 204 to receive and process the password, unique identifier, or other data supplied by the content access module 202 of the cover 104. When the eBook reader device 102 is attached to the cover 104, a communicative connection 110 (FIG. 1) is established between the content access module 202 and the cover communication module 204. The connection 110 may be established through the connectors 108 or alternatively as a wireless connection between the content access module 202 and the cover communication module 204. For instance, the cover communication module 204 may include an RFID tag reader that queries an RFID tag forming the content access module 202 and receives the password or other data wirelessly.

Figure 3:
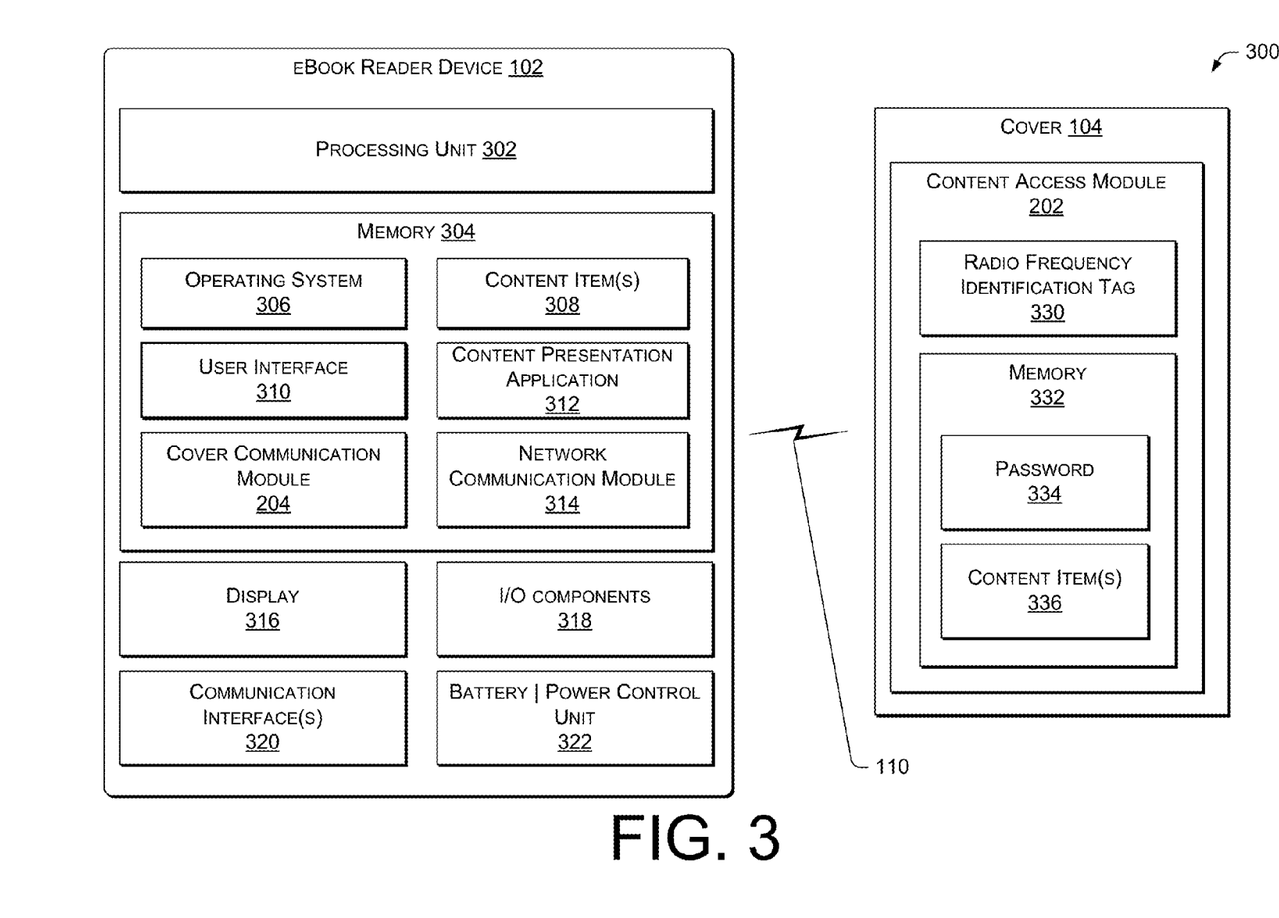
FIG. 3 is a block diagram showing components that may be implemented in subsystems of the eBook reader device and subsystems of the cover.

FIG. 3 illustrates exemplary components 300 that might be implemented in the eBook reader device 102 and the cover 104. In particular, the eBook reader device 102 may be a dedicated, handheld eBook reader device equipped with a passive display to display electronic documents, such as electronic books or "eBooks". The terms "book" and/or "eBook", as used herein, include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages etc. Accordingly, the terms book and/or eBook may include any content that is in electronic or digital form.

In a very basic configuration, the device 102 includes a processing unit 302 composed one of one or more processors, and memory 304. Depending on the configuration of a dedicated eBook reader device 102, the memory 304 is an example of computer storage media and may include volatile and nonvolatile memory. Thus, the memory 304 may include, but is not limited to, RAM, ROM, EEPROM, flash memory, or other memory technology, or any other medium which can be used to store media items or applications and data which can be accessed by the eBook reader device 102.

The memory 304 may be used to store any number of functional components that are executable on the processing unit 302, as well as data and content items that are rendered by the eBook reader device 102. Thus, the memory 304 may store an operating system 306 and an eBook storage database to store one or more content items 308, such as eBooks and audio books. The memory may further include a memory portion designated as an immediate page memory to temporarily store one or more pages of an electronic book. The pages held by the immediate page memory are placed therein a short period before a next page request is expected.

The term "page," as used herein, refers to a collection of content that is presented at one time in a display of the eBook reader device 102. Thus, a "page" may be understood as a virtual frame of the content, or a visual display window presenting the content to the user. Thus, "pages" as described herein are not fixed permanently, in contrast to the pages of published "hard" books. Instead, pages described herein may be redefined or repaginated when, for example, the user chooses a different font for displaying the content in the first display. In addition to pages, the terms "page views", "screen views", and the like are also intended to mean a virtual frame of content.

A user interface module 310 may also be provided in memory 304 and executed on the processing unit 302 to facilitate user operation of the device 102. The UI module 310 may provide menus and other navigational tools to facilitate selection and rendering of the content items 308. The UI module 310 may further include a browser or other application that facilitates access to sites over a network, such as websites or online merchants.

A content presentation application 312 renders the content items 308. The content presentation application 312 may be implemented as various applications depending upon the content items. For instance, the application 312 may be an electronic book reader application for rending electronic books, or an audio player for playing audio books, or a video player for playing video, and so forth.

The cover communication module 204 is also stored in memory 304 and executed on the processing unit 302 to establish a connection with the cover 104. Once the cover 104 is attached or otherwise engaged with the eBook reader device 102, the cover communication module 204 establishes the connection with the cover and attempts to receive the password or other data from the cover 104 to unlock select content items 308 stored on the device, or to download content items from the remote service 112 (FIG. 1).

The memory 304 may further store a network communication module 314 to manage communication between the eBook reader device 102 and remote services 112 over the network 114.

The eBook reader device 102 may further include a display 316. In one implementation, the display uses ePaper display technology, which is bi-stable, meaning that it is capable of holding text or other rendered images even when very little or no power is supplied to the display. Some exemplary ePaper-like displays that may be used with the implementations described herein include bi-stable LCDs, MEMS, cholesteric, pigmented electrophoretic, and others. In other implementations, or for other types of devices, the display may be embodied using other technologies, such as LCDs and OLEDs, and may further include a touch screen interface. In some implementations, a touch sensitive mechanism may be included with the display to form a touch-screen display.

The eBook reader device 102 may further be equipped with various input/output (I/O) components 318. Such components may include various user interface controls (e.g., buttons, joystick, keyboard, etc.), audio speaker, connection ports, and so forth.

One or more communication interfaces 320 are provided to facilitate communication with external, remote computing sources over various networks, such as network 114, or with other local devices, or with the cover 104. Content (e.g., eBooks, magazines, audio books, etc.), as well as program modules, may be transferred to the eBook reader device 102 via the communication interfaces(s) 320. The communication interface(s) 320 support both wired and wireless connection to various networks, such as cellular networks, radio, WiFi networks, short range networks (e.g., Bluetooth), IR, and so forth. The communication connection(s) 320 support both wired and wireless communications with various types of networks (e.g., network 114), including the Internet. For example, the eBook reader device 102 may be equipped with a radio frequency transceiver to facilitate wireless communication over a wireless network. The device may further include a communication connection that facilitates communication with other devices via, for example, Bluetooth, radio frequency, or infrared connection(s).

The eBook reader device 102 also includes a battery and power control unit 322. The power control unit operatively controls an amount of power, or electrical energy, consumed by the eBook reader device. Actively controlling the amount of power consumed by the reader device may achieve more efficient use of electrical energy stored by the battery. The processor 302 may supply computing resources to the power control unit 322, which may further include a clock/timer for accurate control of power consumed by the eBook reader device 102.

The eBook reader device 102 may have additional features or functionality. For example, the eBook reader device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data.

Also shown in FIG. 3 are functional components that might be implemented in the cover 104. The cover 104 contains the content access module 202 (FIG. 2) to facilitate access to content when the cover is coupled to the eBook reader device. In one implementation, the content access module 202 includes an optional RFID tag 330. The RFID tag 330 may be detected by the cover communication module 204 of the eBook reader device 102 when the cover 104 is placed on the eBook reader device 102. In this implementation, the signal from the RFID tag 330 is the communicative coupling 110 between the cover 104 and the eBook reader device 102. The cover communication module 204 may interpret the signal from the RFID tag 330 as a password to unlock access to content stored as one or more of the content items 308 on the eBook reader device 102 or content maintained remotely (such as at the service 112). Accordingly, the content items 308 may be present in the memory 304 of the eBook reader device 102, but only accessible when the cover 104 is placed on the eBook reader device 102. In some implementations, the inaccessible content items are hidden from a user of the eBook reader device 102.

In another implementation, the content unlocked by the password provided by the cover 104 may be stored on the cover itself. As shown in FIG. 3, the content access module 202 of the cover 104 may include an optional memory 332 instead of, or in addition to, the RFID tag 330. The memory 332 may store a password 334 that is provided to the eBook reader device 102 through the communicative coupling 110. In some implementations, the data representing the password 334 may be provided through connectors 108 which attach the cover 104 to the eBook reader device 102. Thus, the mechanism for communicatively coupling the cover 104 to the eBook reader device 102 may be the same mechanism for physically coupling the cover 104 to the eBook reader device 102 (e.g. connectors 108). Alternatively, the physical coupling and the communicatively coupling may be performed by separate mechanisms (e.g., RFID tag 330 and non-conductive connectors 108).

The cover memory 332 may additionally include, in some implementations, one or more content items 336. The content items 336 are available to the eBook reader device 102 only when the cover 104—and thus the memory 332 containing the content items 336—is communicatively coupled to the eBook reader device 102. In this implementation, the cover 104 may enable access to content without the use of a password 334 by providing the content items 336 directly to the eBook reader device. To ensure that the content items 336 remain tied to the cover 104, the content access module 202 and/or the cover communication module 204 may allow the eBook reader device 102 to view the content items 336, but may prevent copying or saving the content items 336 onto the device 102.

In certain implementations, the connectors 108 function as a key and the physical shape of the connectors 108, rather than an electronic signal, provides information which may be interpreted as a password by the cover communication module 204. In this implementation, the content access module 202 represents the physical key-like shape of the connectors 108 and the information embodied by that shape. Thus, the communicative connection 110 is the physical connection between the cover 104 and the eBook reader device 102 because the act of placing the cover 104 (key) onto the eBook reader device 102 (lock) conveys information necessary to enable access to the content.

Various instructions, methods and techniques described herein may be considered in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of computer readable media.

Illustrative Usage Scenarios

Figure 4:
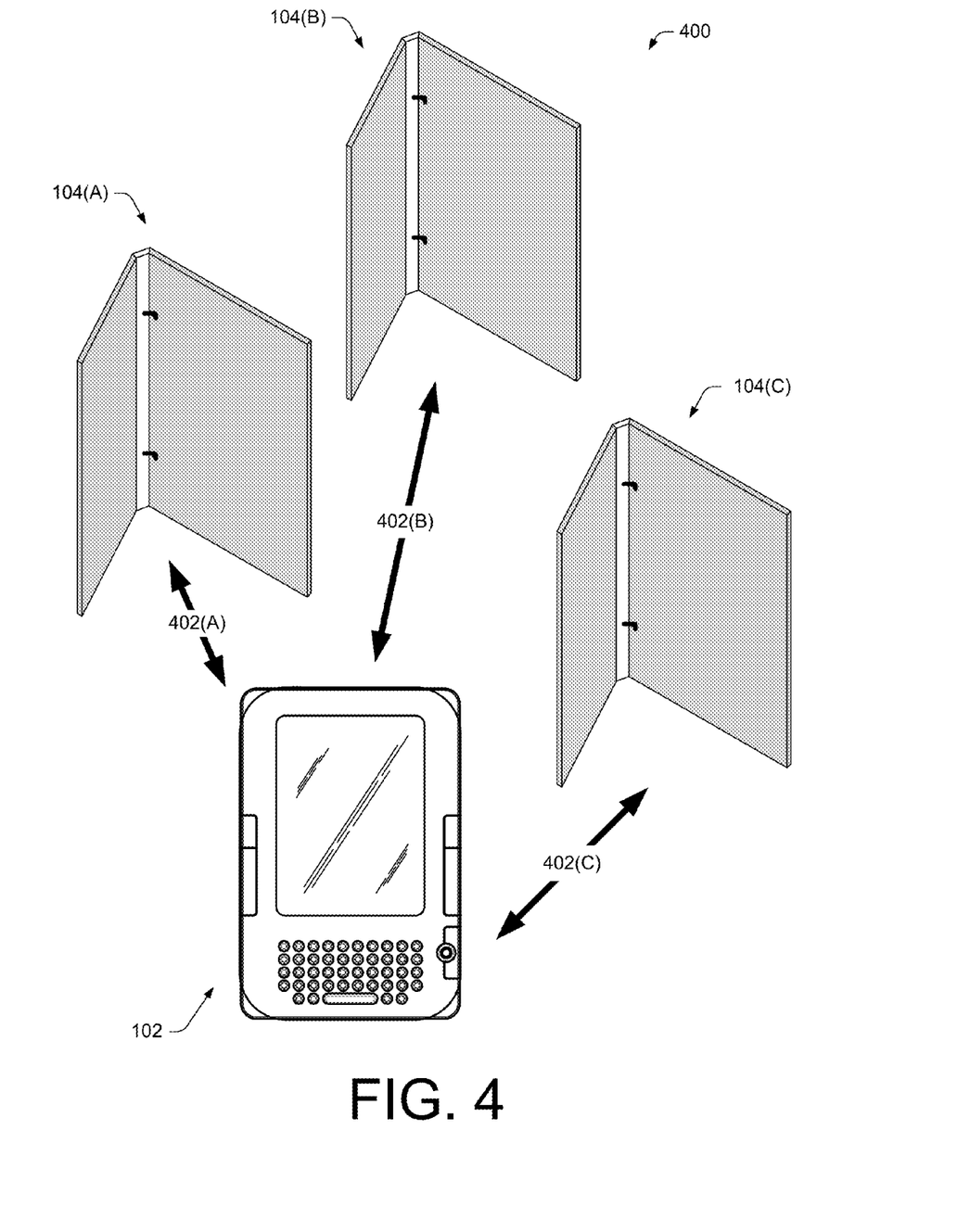
FIG. 4 illustrates one scenario implementation in which a single eBook reader device interacts with a plurality of covers.

FIG. 4 shows a usage scenario representation 400 of the eBook reader device 102 interacting with a plurality of covers 104(A), 104(B), and 104(C). A single eBook reader device 102 may have multiple interactions 402(A), 402(B), 402(C) with the various covers 104(A), 104(B), 104(C). With each interaction, the eBook reader device 102 is exposed to different content by virtue of the interaction with the cover. For instance, replacing one cover (e.g., 104(A)) with another cover (e.g., 104(B)) facilitates access for the eBook reader device 102 to different content items.

The eBook reader device 102 may be thought of as a metaphor for a printed book. Changing the content in the "book" by changing the cover 104 extends the metaphor. When cover art is added to the cover 104, and that art corresponds to the content unlocked by the cover 104, it may be possible to judge an eBook by its cover 104! The cover art readily conveys to the user what content is available by placing that cover 104 on the eBook reader device 102. Changing out different covers 104(A), 104(B), 104(C) on the eBook reader device 102 may be easier for some users to understand and implement than other, arguably more difficult, methods of accessing additional content, such as downloading content from a password-protected website.

In another scenario, covers 104(A), 104(B), 104(C), may be available at various locations such as libraries, coffee shops, airport lounges, and the like. Each of the covers 104(A), 104(B), 104(C), may enable access to location-specific information. For example, a cover available in the seat-back pocket of an airplane may provide access to safety information for that airplane, information similar to an in-flight magazine, or complimentary content items available during flight. Location-specific covers may be branded with the identity of the location. For instance, the cover available in the seat-back pocket may be printed with a logo or color scheme associated with the airline carrier.

In another usage scenario, a family may share a single eBook reader device 102. Each member of the family may have a cover 104(A), 104(B), 104(C), that enables access to content of interest to him or her. Additional benefit provided by the cover 104 in this usage scenario is that other members of the family will be able to readily recognize who was last using the eBook reader device 102 by the cover 104. Extending this scenario further, the different family covers may provide access to different content, such as child-appropriate content for children, teenage-appropriate content for teenagers, and a broader range of content for adults.

In a further illustrative usage scenario, a university could distribute eBook reader devices 102 to its students. The eBook reader devices 102 may have the entire contents of the university bookstore pre-loaded into the memory of the eBook reader devices 102. The default setting may be for the pre-loaded contents to be locked and inaccessible until a cover 104 is attached. Each student may have an individualized cover 104, possibly encoded with a unique identifier, such as a student identification number, that unlocks electronic textbooks corresponding to the courses for which that student is registered. For example, the student may place one cover 104(C) on the eBook reader device 102 when he or she needs to access a textbook, and may place a different cover 104(B) on the eBook reader device 102 when he or she wishes to read a novel.

As discussed above, the communicative connection between the cover 104 and the eBook reader device 102 may take many forms. Covers 104 designed around different types of technology may use different mechanisms of communicating with the eBook reader device 102. For example, cover 104(A) may form a communicative connection 402(A) with the eBook reader device 102 by a RFID signal. However, cover 104(B) may use electrically conductive connectors (e.g., connectors 108) to form a communicative connection 402(B) with the same eBook reader device 102.

Figure 5:
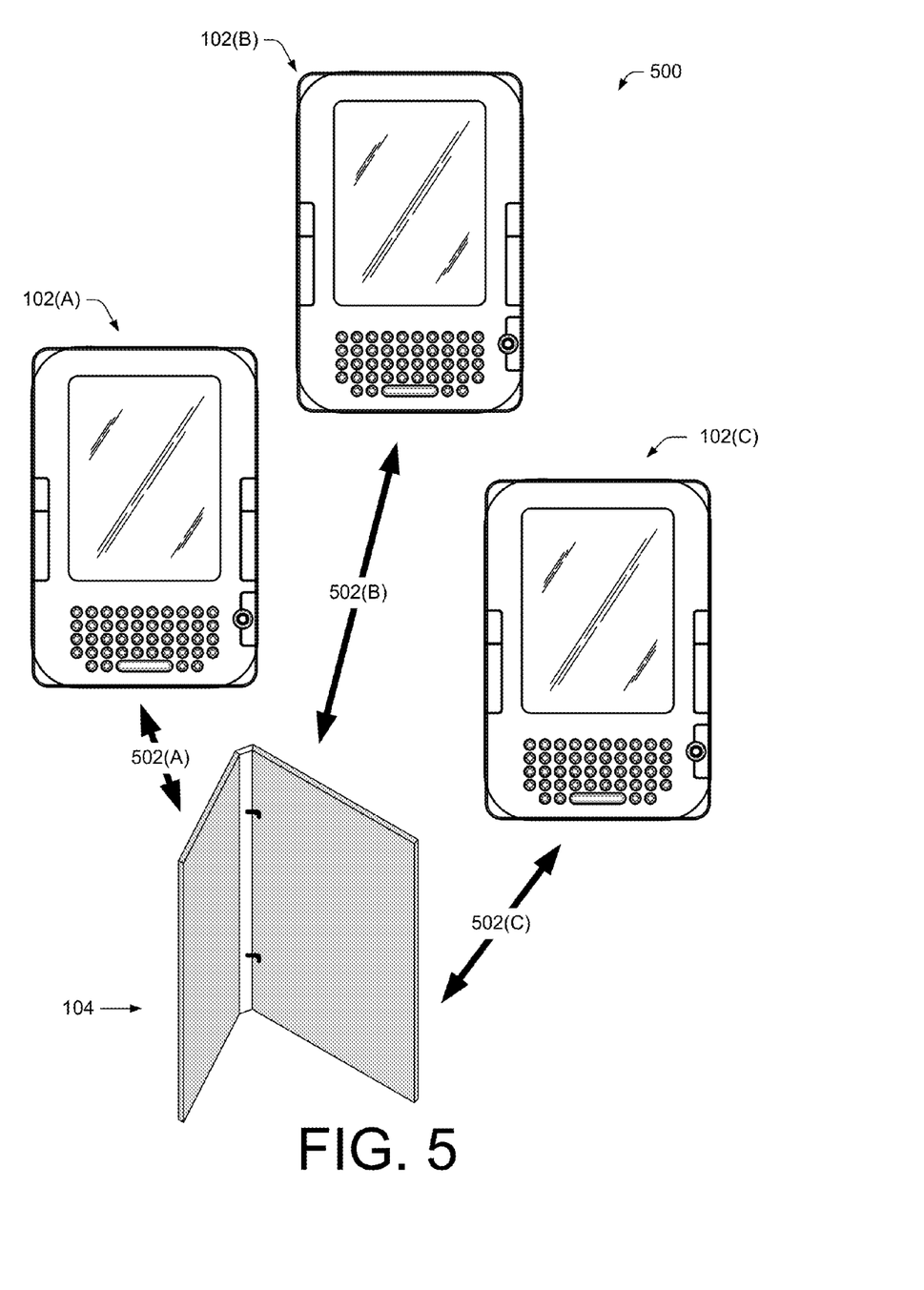
FIG. 5 illustrates another scenario implementation in which a single cover interacts with a plurality of eBook reader devices.

FIG. 5 shows another usage scenario representation 500 in which a single cover 104 interacts with a plurality of eBook reader devices 102(A), 102(B), and 102(C). In some implementations, a user may use his or her personal cover 104 with multiple eBook reader devices 102(A), 102(B), 102(C). A communicative connection 502(A), 502(B), 502(C), may allow the cover 104 to enable access to content on the respective eBook reader devices 102(A), 102(B), and 102(C).

In one possible usage scenario, a library provides eBook reader devices 102(A), 102(B), and 102(C) for public use and users may supply their own covers to access additional content. In addition to enabling access to additional content, a personalized cover 104 may also supply customization settings that modify the user interface of the eBook reader device 102 as will be discussed in detail below.

One type of additional content may be periodic content, such as a newspaper subscription, Book-of-the-Month membership, or the like. For example, a newspaper publisher may sell a cover 104 that provides access to that newspaper's content by enabling an eBook reader device 102 to access that content from the newspaper's online service 112 over a network 114. By simply placing a cover 104 on an eBook reader device 102, it becomes possible to read today's newspaper. Desirability of this type of "high-value" content may make the cover 104 as important as the eBook reader device 102.

Illustrative Processes

Figure 6:
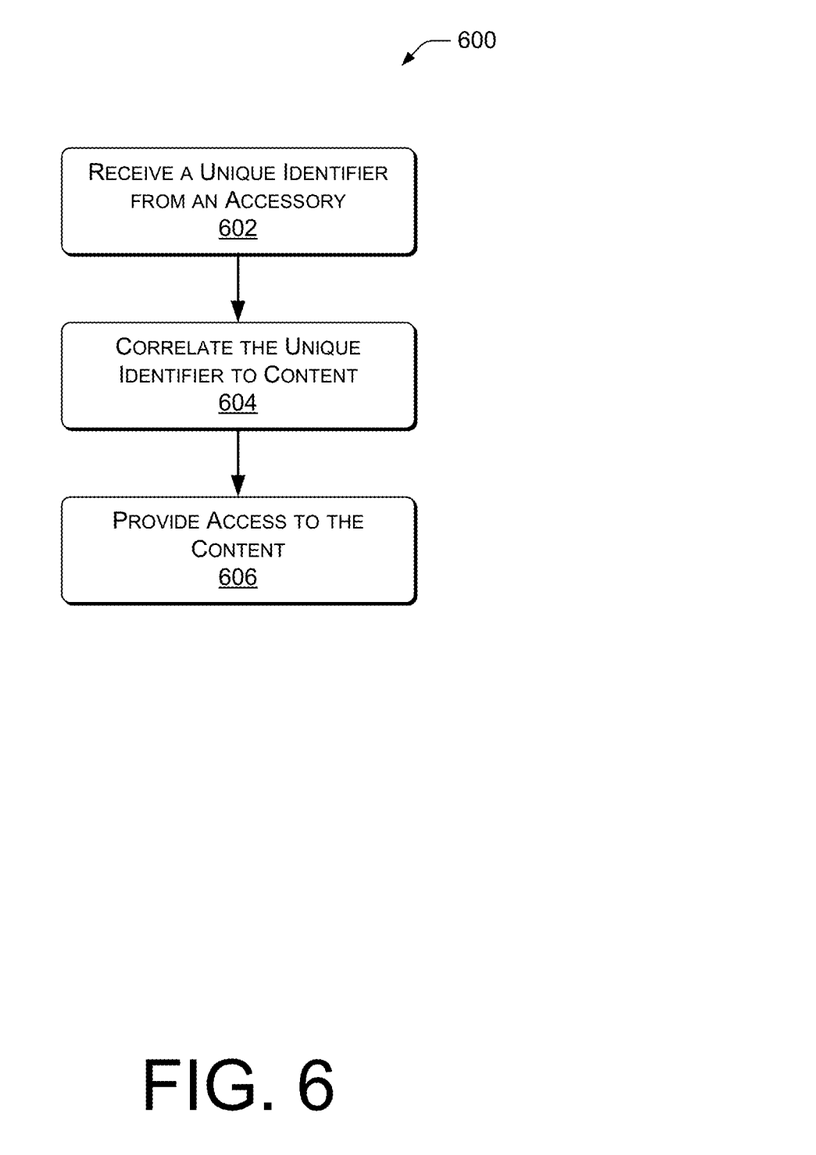
FIG. 6 is a flow diagram illustrating a process of providing access to content.

FIG. 6 shows a general process 600 for using a unique identifier obtained from an accessory, such as a cover, to access content that would otherwise be unavailable to an eBook reader device. For ease of understanding, the process 600 (as well as processes 700 in FIG. 7, and 800 in FIG. 8) is delineated as separate acts or operations represented as independent blocks. However, these separately delineated acts should not be construed as necessarily order dependent in their performance. The order in which the process is described is not intended to be construed as a limitation, and any number of the described process blocks maybe be combined in any order to implement the process, or an alternate process. Moreover, it is also possible that one or more of the provided process blocks be omitted. For purposes of discussion, the processes 600, 700, and 800 will be described in the context of the assembly 106 illustrated and described with reference to FIGS. 1-5.

At 602, a unique identifier is received from an accessory. The accessory may be the cover 104. The unique identifier may be a password, such as the password 334 shown in FIG. 3. The unique identifier may be received through a direct electrical connection (e.g., via connectors 108), wirelessly (e.g., a signal generated through query of the RFID tag 330), or by another mechanism.

At 604, the unique identifier is correlated to a content. The content may be stored as one or more content items 308 in the memory 304 of the eBook reader device 102. In one implementation, the content may be an electronic document, such as an eBook. In other implementations, the content may be available at remote locations, such as the service 112 accessible over the network 114. Content accessible over the network 114 may be retrieved in an on-demand fashion.

The correlation of the unique identifier to the content may be performed by the cover communication module 204. In other implementations, the correlation may be performed by the service 114, which supplies the results of that correlation back to the eBook reader device 102.

At 606, access to the content is provided on the eBook reader device 102 based on the unique identifier. Access may be implemented by many mechanisms, such as unlocking pre-loaded content, downloading new content, and the like. Regardless of the mechanism, once access to the content is provided, a user of the eBook reader device 102 may view the content. In some implementations, access to the content is provided only so long as the accessory, such as cover 104, is attached to the eBook reader device 102.

Figure 7:
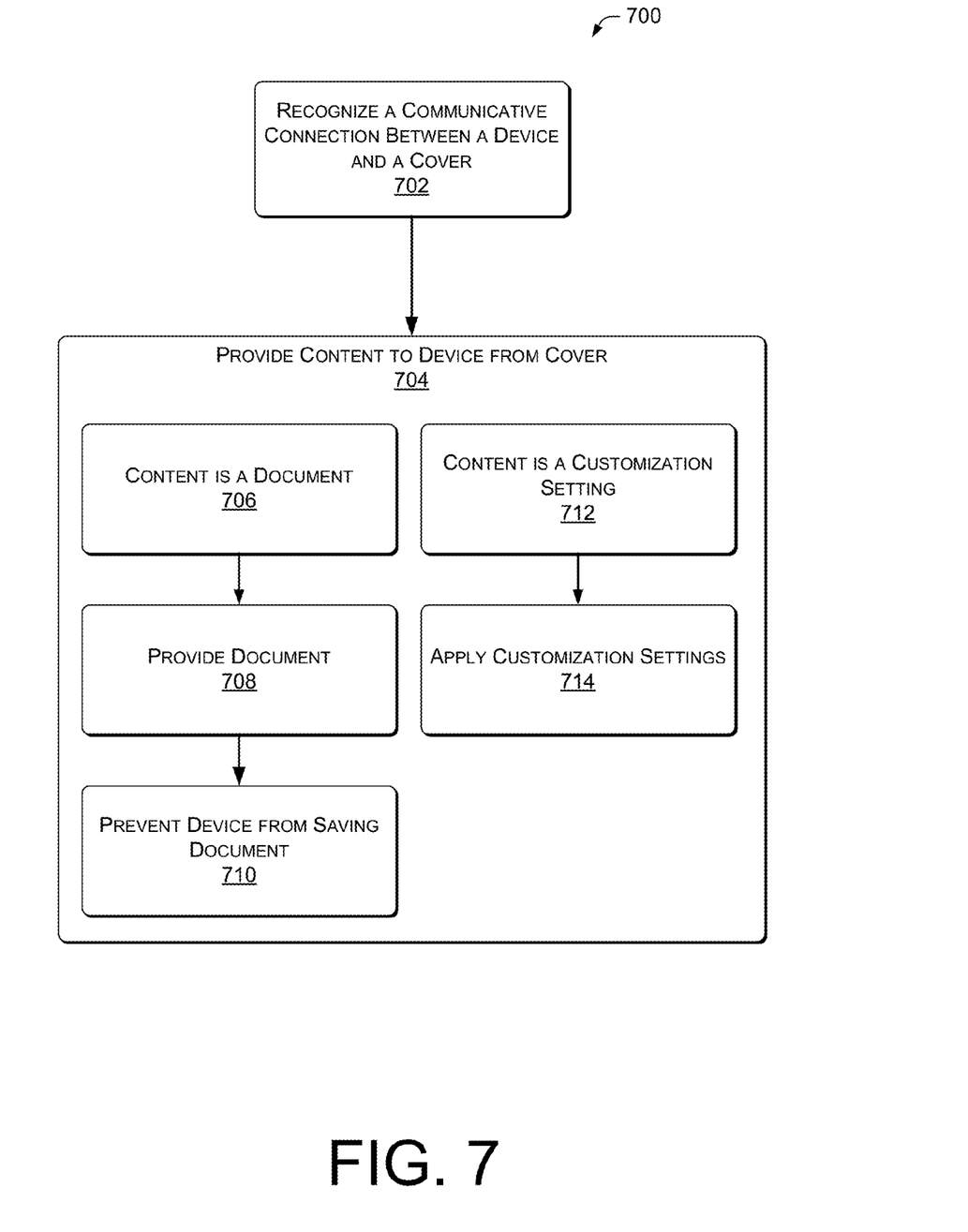
FIG. 7 is a flow diagram illustrating a process of providing content to a device from a cover.

FIG. 7 shows a process 700 for providing content to the eBook reader device 102 from a memory in the cover 104. The cover 104 may be configured to protect the outer surfaces of the eBook reader device 102.

At 702, a communicative connection between the eBook reader device 102 and the cover 104 is recognized. The communicative connection may be the communicative connection 110 shown in FIG. 1. In some implementations, the recognition is performed by the cover communication module 204 of the eBook reader device 102.

At 704, the content is provided to the eBook reader device 102 from the memory 332 of the cover 104 (FIG. 4). The content may be in the form of an electronic document 706, as shown by the sub-process 706-710 as part of operation 704. As discussed above, the document may be an eBook. At 708, the document is provided to the eBook reader device 102 after the communication connection between the cover and device is recognized. Once provided to the eBook reader device 102, a user may be able to view the document.

At 710, the eBook reader device that is presenting the document to the user is prevented from saving or otherwise copying the document. As shown in FIG. 3, without such prevention, copying the document from the memory 332 of the cover 104 to the memory 304 of the eBook reader device 102 could allow access to the document when the eBook reader device 102 is not attached to the cover 104. In order to prevent this and ensure that the document is tied to the cover 104, the eBook reader device 102 is prevented from saving an accessible copy of the document absent attachment of the cover. This may be accomplished through enabling the eBook reader device 102 to only read the document from the memory 332 of the cover. Alternatively, the document may be saved to the eBook reader device 102 (e.g., to provide faster access to a large document), but a password supplied by the cover 104 remains necessary to access the document.

In another implementation, the content may be in the form of a customization setting 712 for the eBook reader device, as represented by the sub-process 712-714 as part of operation 704. The customization setting may alter a user interface of the eBook reader device 102 such as by changing menus, favorites, default languages, look-and-feel of the user interface, and so forth. The customization settings allow any compatible eBook reader device 102 to be customized or personalized when a user places his or her cover 104 on the eBook reader device 102.

At 714, the customization settings are applied and the eBook reader device 102 is customized accordingly. In some implementations, the customization settings are accessibility settings. Accessibility settings may also change aspects of the user interface such as text size, text contrast, audio volume, and the like to improve usability of the eBook reader device for users with low vision, color blindness, or another disability.

Figure 8:
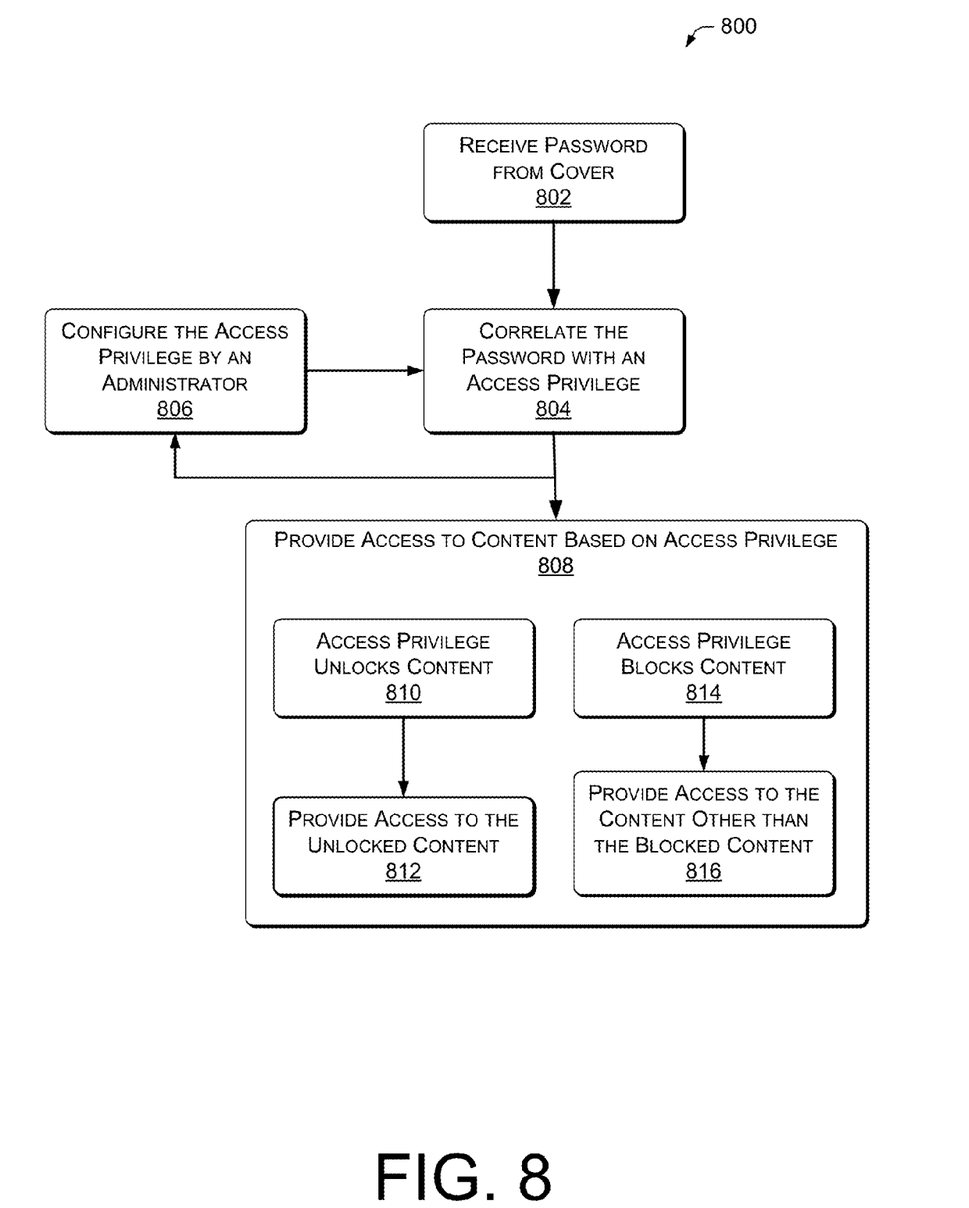
FIG. 8 is a flow diagram illustrating a process of providing access to content based on an access privilege.

FIG. 8 shows a process 800 for providing access to content based on an access privilege.

At 802, a password is received from a cover 104 of an eBook reader device 102. The password may be provided by a memory of the cover 102, an RFID tag embedded in the cover 102, a shape of connectors 108 attaching the cover 102 to the eBook reader device 104, or the like.

At 804, the password is correlated with an access privilege. In some implementations, the correlation may be performed by the cover communication module 204 of the eBook reader device 102. In other implementations, the correlation may be performed by a service 112 available on the network 114.

At 806, the access privilege may be optionally configured by an administrator. In this implementation, the content made available by the cover 102 are not fixed, but rather are determined by a configurable access privilege. The access privilege may simply be a list of accessible documents to which documents may be added or removed. In other implementations, the access privilege may establish rules or principles by which a given document can be evaluated to decide whether or not it is unlocked by the cover 104. The administrator may be a user of the eBook reader device 102 with greater privileges than other users of the eBook reader device 102 (e.g., an original purchaser of the eBook reader device, a librarian, a corporate information technology professional). In other implementations, the administrator may interact with the cover 104 via the network 114. For example, a remote administrator may change the access privileges assigned to the password provided by the cover 104.

At 808, access to content is provided based on the access privilege. Placing a cover 104 on the eBook reader device 102 generally unlocks or enables access to more content than would be available without the cover 104, as represented by sub-process 810-812. However, the cover 104 may also block content or make content inaccessible, as represented by sub-process 814-816.

At 810, the access privilege unlocks content. The unlocked content may be provided by the cover 104, the eBook reader device 102, and/or a remote service 112 via the network 114. At 812, access to the unlocked content is provided to the eBook reader device 102 for presentation to a user.

At 814, the access privilege may alternatively block certain content. In this implementation, placing the cover 104 on the eBook reader device 102 limits, rather than expands, the available content. For example, a parent may wish to limit a child's access to documents stored on the eBook reader device 102. The access privilege could be tied to an age-based ratings system so that documents with certain ratings are unavailable when the child's cover 104 is placed on the eBook reader device 102. The parent may have administrator-level access to the eBook reader device 102 and may change the access privileges associated with the child's cover 104 as the child becomes older and different content becomes appropriate.

At 816, access is provided to content other than the blocked content. In some implementations, the other content may include content which is unlocked by the cover 104. Returning to the example of a cover 104 for a child, the child may be incentivized to place the eBook reader device 102 into his or her cover 104 because that cover 104 enables access to children's stories. Additionally, that same cover 104 may block access to eBooks intended for adult readers. Thus, the sub-process flows of acts 810-812 and of acts 814-816 may occur in parallel. In short, the cover 104 may simultaneously unlock some content and block other content.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A computer-implemented method comprising:
   determining a communicative connection between one or more first connectors of an accessory and one or more second connectors of an electronic book reader device, a physical shape of at least one first connector of the one or more first connectors of the accessory being a unique identifier; and
   providing, via the communicative connection and to the electronic book reader device, access to content based at least in part on the unique identifier.

2. The computer-implemented method of claim 1, wherein the accessory comprises a cover for the electronic book reader device.

3. The computer-implemented method of claim 1, wherein the content comprises an electronic document.

4. The computer-implemented method of claim 1, wherein electronic signals are not passed between the accessory and the electronic book reader device.

5. A cover for a dedicated electronic book reader device, the cover comprising:
   a memory that stores content;
   a coupling element that at least partially secures the cover to a corresponding element of the dedicated electronic book reader device, the coupling element including:
      a communicative connection between the memory and the dedicated electronic book reader device; and
      a unique identifier that provides access to the content stored in the memory, the unique identifier being a physical shape of the coupling element; and
   transmitting the content from the memory of the cover to the dedicated electronic book reader device via the communicative connection.

6. The cover of claim 5, further comprising one or more flaps having interior and exterior surfaces configured to protect at least one outer surface of the dedicated electronic book reader device.

7. The cover of claim 5, wherein the memory is read-only memory.

8. The cover of claim 5, wherein the content comprises an audio book.

9. The cover of claim 5, wherein the coupling element is positioned along a spine of the cover.

10. A computer-implemented method comprising:
    determining a communicative connection between one or more first coupling elements of an electronic device and one or more second coupling elements of a cover configured to protect at least one outer surface of the electronic device, a physical shape of a second coupling element of the one or more second coupling elements being a unique identifier that enables access to content stored in a memory of the cover; and
    providing, via the communicative connection and to the electronic device, access to the content in the memory of the cover based at least in part on the unique identifier.

11. The computer-implemented method of claim 10, wherein the electronic device comprises a dedicated electronic book reader device.

12. The computer-implemented method of claim 10, wherein the content further comprises user customization settings that include at least accessibility settings.

13. The computer-implemented method of claim 12, wherein, in response to being adjusted, the user customization settings cause an alteration of a user interface of the electronic device.

14. The computer-implemented method of claim 12, wherein, in response to being adjusted, the accessibility settings cause an alteration of text contrast settings of a user interface of the electronic device to improve usability of the electronic device for a user with low vision.

15. The computer-implemented method of claim 10, wherein the communicative connection comprises an electrically conductive connection between the cover and the electronic device established by at least one electrically conductive connector, the electrically conductive connector also physically holding the cover to the electronic device.

16. The computer-implemented method of claim 10, wherein the communicative connection comprises a wireless connection between the cover and the electronic device.

17. The computer-implemented method of claim 10, further comprising refraining, by the electronic device, from saving the content to a memory within the electronic device.

18. The computer-implemented method of claim 10, wherein providing access to the content to the electronic device ceases in response to the communicative connection being disconnected.

19. A dedicated electronic book reader device, comprising:
    a physical coupling element that at least partially secures the dedicated electronic book reader device to a corresponding element of a cover;
    a communication interface, comprising one or more first connectors to facilitate communication with one or more second connectors of the cover;
    a processor;
    a memory accessible by the processor; and
    a cover communication module stored in the memory and executable on the processor, wherein the cover communication module is configured to access content stored on the cover via the communication interface based at least in part on a coupling between at least one second connector of the one or more second connectors and at least one first connector of the one or more first connectors, wherein a physical shape of the at least one second connector is a unique identifier that enables access to the content stored on the cover.

20. The dedicated electronic book reader device of claim 19, wherein the content comprises an electronic book (eBook).

21. The dedicated electronic book reader device of claim 20, wherein the eBook is provided by periodic subscription and the cover is sold by a publisher of the eBook.

22. The dedicated electronic book reader device of claim 19, wherein the physical coupling element further establishes an electronic path for the communication interface.

23. The dedicated electronic book reader device of claim 19, wherein the content is stored in an RFID tag, and the communication interface comprises an RFID tag reader to query the RFID tag to receive the content wirelessly, in response to the coupling between the second connector and the at least one first connector.

24. The dedicated electronic book reader device of claim 19, wherein the communication interface further establishes a network connection to a remote source over a network.

25. The dedicated electronic book reader device of claim 19, wherein the communication interface comprises a wireless communication component.

26. A non-transitory computer-readable storage medium having stored therein instructions, which when executed by an electronic device, cause the electronic device to perform acts comprising:

accessing content from a cover of the electronic device via a communicative connection between one or more first connectors associated with the electronic device and one or more second connectors associated with the cover, a physical shape of a second connector of the one or more second connectors being a unique identifier;

correlating the unique identifier to the content stored on the cover, wherein the unique identifier is associated with an access privilege of a specific user; and     providing access to the content associated with the specific user that is stored on the cover based on the access privilege, wherein the access privilege unlocks a first content and blocks a second content.

27. The non-transitory computer-readable storage medium of claim 26, wherein the first content or the second content is stored in memory of the cover and the access privilege unlocks access to the content.

28. The non-transitory computer-readable storage medium of claim 26, wherein the content comprises an electronic book (eBook) or audio book.

29. The non-transitory computer-readable storage medium of claim 26, wherein the access privilege is configurable by an administrator who has greater privileges than other users of the electronic device.

30. The non-transitory computer-readable storage medium of claim 26, wherein the access privilege is based at least in part on an age-based ratings system.

\* \* \* \* \*